US012683380B2

(12) United States Patent
Wang et al.

(10) Patent No.: US 12,683,380 B2
(45) Date of Patent: Jul. 14, 2026

(54) MODULAR SOLID-STATE CIRCUIT BREAKER INCLUDING INTEGRATED SWITCH AND VOLTAGE-CLAMPING ELEMENTS

(71) Applicant: University of Tennessee Research Foundation, Knoxville, TN (US)

(72) Inventors: Fei Wang, Knoxville, TN (US); Hua Bai, Knoxville, TN (US); Ruirui Chen, Knoxville, TN (US); Zhou Dong, Raleigh, NC (US); Zhe Yang, San Jose, CA (US)

(73) Assignee: University of Tennessee Research Foundation, Knoxville, TN (US)

( * ) Notice: Subject to any disclaimer, the term of this patent is extended or adjusted under 35 U.S.C. 154(b) by 28 days.

(21) Appl. No.: 18/185,467

(22) Filed: Mar. 17, 2023

(65) Prior Publication Data

US 2024/0313522 A1 Sep. 19, 2024

(51) Int. Cl.
*H02H 3/20* (2006.01)
*H02H 9/04* (2006.01)

(52) U.S. Cl.
CPC ................ *H02H 3/20* (2013.01); *H02H 9/04* (2013.01)

(58) Field of Classification Search
CPC .................................. H02H 3/20; H02H 9/04
USPC ....................................................... 361/91.5
See application file for complete search history.

(56) References Cited

U.S. PATENT DOCUMENTS

| | | | | |
|---|---|---|---|---|
| 11,973,339 B2 * | 4/2024 | Wang | .................... | H02M 1/344 |
| 2019/0341769 A1 * | 11/2019 | Askan | .................... | H01H 9/547 |
| 2020/0212666 A1 * | 7/2020 | Manahan | ............. | H01H 1/5866 |
| 2022/0045506 A1 * | 2/2022 | Wang | .................... | H02H 7/268 |
| 2022/0231684 A1 * | 7/2022 | Mehrotra | ............. | H03K 17/162 |
| 2023/0046316 A1 * | 2/2023 | Liu | ........................ | H01H 9/542 |
| 2023/0230783 A1 * | 7/2023 | Yang | ........................ | H02H 3/42 |
| | | | | 361/115 |
| 2023/0261462 A1 * | 8/2023 | Zhang | .................... | H02H 3/087 |
| | | | | 361/93.9 |
| 2023/0361771 A1 * | 11/2023 | Prasad | ................. | H03K 17/687 |
| 2024/0305086 A1 * | 9/2024 | Yang | ........................ | H01H 9/548 |

FOREIGN PATENT DOCUMENTS

| | | | | | |
|---|---|---|---|---|---|
| CN | 119093272 A | * | 12/2024 | ............. | H03K 17/72 |
| EP | 3514815 A1 | * | 7/2019 | ............... | H02H 3/08 |
| GB | 2610866 A | * | 3/2023 | .......... | H02H 1/0007 |
| GB | 2628161 A | * | 9/2024 | ............... | H01H 9/54 |
| JP | 2023151525 A | * | 10/2023 | | |
| KR | 20220131078 A | * | 9/2022 | ............... | H02H 5/04 |
| KR | 20230006299 A | * | 1/2023 | .......... | H02H 1/0007 |
| WO | WO-2023151872 A1 | * | 8/2023 | ............... | H02H 9/04 |
| WO | WO-2024196466 A1 | * | 9/2024 | ............. | H02H 3/202 |

* cited by examiner

*Primary Examiner* — Dharti H Patel
(74) *Attorney, Agent, or Firm* — Myers Bigel, P.A.

(57) ABSTRACT

A solid-state circuit breaker (SSCB) module includes a module housing comprising a heatsink and having a plurality of fins extending therefrom configured to dissipate heat; and a circuit breaker circuit comprising at least one semiconductor switch connected in parallel to at least one voltage clamping element, such as, for example, at least one transient voltage suppression (TVS) diode and/or at least one metal oxide varistor (MOV), the circuit breaker circuit being integrated inside the module housing.

19 Claims, 7 Drawing Sheets

100

200

Control
Signal

Uni-directional
SSCB

210

Control
Signal

Control
Signal

Bi-directional
SSCB

300

300

MODULAR SOLID-STATE CIRCUIT BREAKER INCLUDING INTEGRATED SWITCH AND VOLTAGE-CLAMPING ELEMENTS

STATEMENT REGARDING FEDERALLY SPONSORED RESEARCH OR DEVELOPMENT

This invention was made with government support under contract number NSF EEC-1041877 awarded by the National Science Foundation. The government has certain rights in the invention.

FIELD

The present inventive concepts relate generally to power systems and, more particularly, to circuit breakers used in power systems.

BACKGROUND

Power systems, such as direct current (DC) and alternating current (AC) power systems, are commonly used in many different applications. A circuit breaker is a common component in many power systems that is used to isolate or protect sensitive equipment or components due to, for example, an overcurrent or short circuit condition. Electric vehicles, secondary power distribution networks, and photovoltaic systems use sensitive components and equipment and, therefore, may benefit from the use of some type of fault protection in their systems and networks. Traditional electromechanical circuit breakers have generally low reliability and a relatively high cost. Moreover, these devices may be too slow to respond to a fault event, especially for DC systems where the fault current may rise fast during a short circuit. Solid-state circuit breakers have been developed, which have primarily been based on silicon devices, such as a silicon isolated gate bipolar transistor (IGBT) or a silicon thyristor. These silicon-based devices may suffer from conduction losses due to large on-state resistance and may also be temperature sensitive. To address the temperature sensitivity, additional thermal management techniques may be used, such as additional radiators and/or water cooling, but these techniques add weight and volume to the circuit breaker.

SUMMARY

According to some embodiments of the inventive concept, a solid-state circuit breaker (SSCB) module comprises: a module housing comprising a heatsink and having a plurality of fins extending therefrom configured to dissipate heat; and a circuit breaker circuit comprising at least one semiconductor switch connected in parallel to at least one voltage clamping element, the circuit breaker circuit being integrated inside the module housing.

In other embodiments, the circuit breaker circuit comprises a plurality of semiconductor switches connected in parallel to the at least one voltage clamping element.

In still other embodiments, the circuit breaker circuit comprises the plurality of semiconductor switches connected in parallel to a plurality of voltage clamping elements, respectively.

In still other embodiments, the at least one voltage clamping element comprises at least one transient voltage suppression (TVS) diode and/or at least one metal oxide varistor (MOV), and the semiconductor switch is a metal oxide semiconductor field effect transistor (MOSFET).

In still other embodiments, the MOSFET is a SiC MOSFET or an Si MOSFET.

In still other embodiments, the semiconductor switch is a high electron mobility transistor (HEMT), a thyristor, or an insulated gate bipolar transistor (IGBT).

In still other embodiments, the HEMT is a GaN HEMT.

In still other embodiments, the semiconductor switch is a unidirectional switch.

In still other embodiments, the semiconductor switch is a bidirectional switch, and the semiconductor switch comprises one or more anti-series semiconductor switches or one or more anti-parallel semiconductor switches.

In still other embodiments, the SSCB module further comprises a snubber circuit connected in parallel to the circuit breaker circuit, the snubber circuit being integrated inside the module housing.

In still other embodiments, the SSCB module further comprises a driver circuit integrated inside the module housing and connected to the at least one semiconductor switch.

In still other embodiments, the circuit breaker circuit is one of a plurality of circuit breaker circuits.

In still other embodiments, the circuit breaker circuits are connected in series.

In still other embodiments, the circuit breaker circuits are connected in parallel, In still other embodiments, a first subset of the plurality of circuit breaker circuits are connected in series and a second subset of the plurality of circuit breaker circuits are connected in parallel.

According to some embodiments of the inventive concept, a system comprises: at least one solid-state circuit breaker (SSCB) module, the SSCB module comprising: a module housing comprising a heatsink and having a plurality of fins extending therefrom configured to dissipate heat; and a circuit breaker circuit comprising at least one semiconductor switch connected in parallel to at least one voltage clamping element, the circuit breaker circuit being integrated inside the module housing; and a controller coupled to the SSCB module and configured to generate a control signal responsive to a short circuit event in an electrical load. The at least one semiconductor switch is responsive to the control signal.

In further embodiments, the at least one SSCB module comprises a plurality of SSCB modules.

In still further embodiments, the SSCB modules are connected in series.

In still further embodiments, the SSCB modules are connected in parallel.

In still further embodiments, a first subset of the plurality of SSCB modules are connected in series and a second subset of the plurality of SSCB modules are connected in parallel.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive concept will be or become apparent to one with skill in the art upon review of the following drawings and detailed description. It is intended that all such additional systems, methods, articles of manufacture, and/or computer program products be included within this description, be within the scope of the present inventive subject matter and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
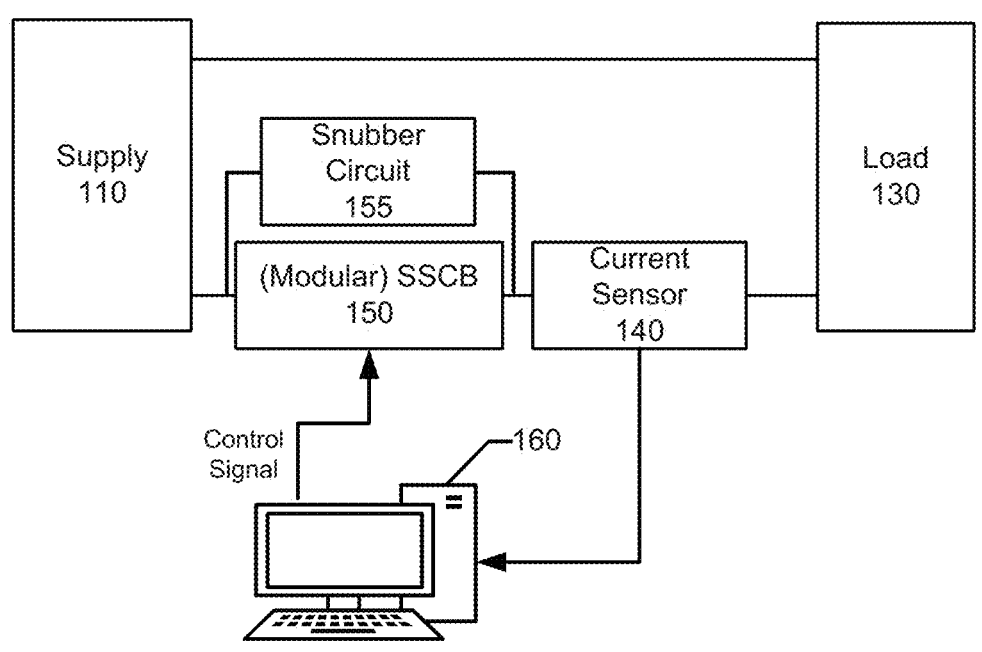
FIG. 1 is a block diagram that illustrates a modular solid-state circuit breaker (SSCB) system in accordance with some embodiments of the inventive concept.

In the following detailed description, numerous specific details are set forth to provide a thorough understanding of embodiments of the inventive concept. However, it will be understood by those skilled in the art that embodiments of the inventive concept may be practiced without these specific details. In some instances, well-known methods, procedures, components, and circuits have not been described in detail so as not to obscure the inventive concept. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Some embodiments of the inventive concept stem from a realization that traditional circuit breakers have a number of different disadvantages with respect to performance, thermal management, and weight. For example, circuit breaker devices based on discrete metal oxide semiconductor field effect transistors (MOSFETs) or integrated MOSFETs configured in parallel with discrete volage clamping elements, such as transient voltage suppression (TVS) diodes and/or metal oxide varistors (MOVs), may be relatively low cost, but the longer leads may result in larger loop inductance, which can induce a high voltage spike during a short circuit event. Many conventional circuit breaker devices use water cooling for thermal management, but the water-cooling component can significantly increase weight and may require additional mechanical support. Conventional circuit breaker devices that simply use the surface area of the base plate or housing may have the benefit of a simple and low-cost design, but the housing may not be particularly effective at dissipating heat. Discrete MOSFET, TVS, and/or MOV components may be flexible with respect to modularity, but reconfigurability generally requires disassembly and reconfiguration, which may be infrequently considered.

Some embodiments of the inventive concept may provide a solid-state circuit breaker (SSCB) module in which the dies of switches and voltage clamping elements, e.g., TVS diodes and/or MOVs, are integrated inside of the module housing. The module housing may include top and bottom plates with the bottom plate comprising a heatsink with multiple fins extending therefrom. With the heatsink being used as the baseplate of the module housing, forced air cooling and/or water cooling is unnecessary thereby saving weight, size, and expense. By integrating the switches and voltage clamping elements, e.g., TVS diodes and/or MOVs, inside the module, loop inductance and overvoltage (i.e., induced high voltage spikes) may be reduced relative to discrete component-based designs. Gate driver circuitry for MOSFET switches may also be integrated into the SSCB module with the MOSFETS and TVS diodes, which may reduce parasitic gate inductance and external circuitry complexity along with the overall volume and weight of the SSCB module.

FIG. 1 is a block diagram that illustrates a modular SSCB system in accordance with some embodiments of the inventive concept. Referring to FIG. 1, the power system 100 includes a power supply 110 that delivers power to a load 130. The power supply 110 may be an alternating current (AC) or a direct current (DC) power supply in accordance with different embodiments of the inventive concept. To protect the load 130 from fault events, such as short circuits, an SSCB system 150, which may include one or more SSCB modules, is put in series in the circuit between the power supply 110 and the load 130. A current sensor 140 may be configured to generate a short circuit or overcurrent event notification signal responsive to detecting an increase in current due to a short circuit or overload. The controller 160 may be configured to generate a control signal responsive to the short circuit or overload event notification signal, which may be used to drive the SSCB system 150 to open the switches therein to create an open circuit thereby reducing or eliminating the current through the load 130. A snubber circuit 155 may be used to limit the switching voltage amplitude to reduce power dissipation. In some embodiments, the snubber circuit 155 may be a resistor and capacitor connected in series to form an RC circuit, which is then connected in parallel across the SSCB system 150.

Figure 2A:
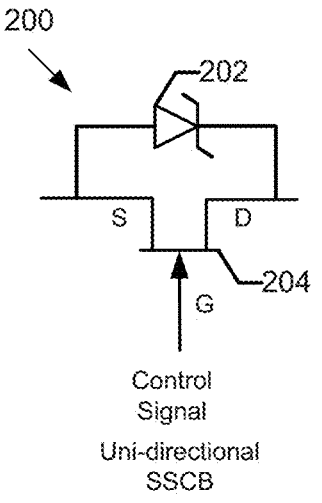
FIG. 2A is a diagram of a uni-directional circuit breaker circuit in accordance with some embodiments of the inventive concept.
Figure 2B:
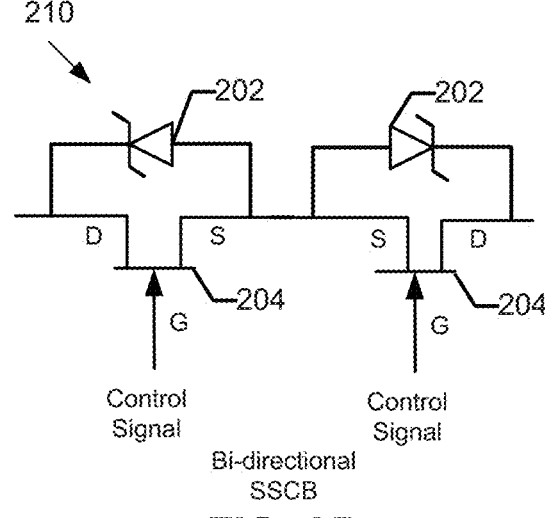
FIG. 2B is a diagram of a bi-directional SSCB in accordance with some embodiments of the inventive concept.

FIG. 2A is a diagram of a circuit breaker circuit 200, which may be used in an SSCB module, which may be part of an SSCB system 150 in accordance with some embodiments of the inventive concept. Referring to FIG. 2, the circuit breaker circuit 200 includes a voltage clamping element, such as a TVS diode 202, which is coupled in parallel to a switch 204. While a TVS diode is shown in the example of FIG. 2A, it will be understood that multiple TVS diodes, one or more MOVs, or any combination of one or more TVS diodes with one or more MOVs can be used in other embodiments of the inventive concept. The TVS diode 202 may act as a transient voltage suppressor to suppress the amount of voltage that can be developed across another device at any given time. The TVS diode 202 protects the switch 204 from voltage spikes by clamping the voltage to a set level. In the example shown in FIG. 2, the switch 204 is implemented as a MOSFET device in which the control signal from the controller 160 is used to open or close the circuit between the source S and drain D terminals. In the example shown in FIG. 2, the circuit breaker circuit 200 shows a single TVS diode 202 connected in parallel with a single switch 204. It will be understood, however, that in accordance with various embodiments of the inventive concept, a single TVS diode 202 may be coupled in parallel to a circuit including multiple serially connected switches 204, multiple serial connected TVS diodes 202 or MOVs may form a circuit that is coupled in parallel to a single switch 204, or multiple serial connected TVS diodes 202 or MOVs may form a circuit that is coupled in parallel to a circuit including multiple serially connected switches 204. Moreover, FIG. 2A illustrates a circuit breaker circuit 200 configured as a uni-directional SSCB. In other embodiments shown in FIG. 2B, a circuit breaker circuit 210 configured as a bi-directional SSCB may include two implementations of the uni-directional circuit breaker circuit 200 coupled in series with their source terminals connected to one another.

Figure 3A:
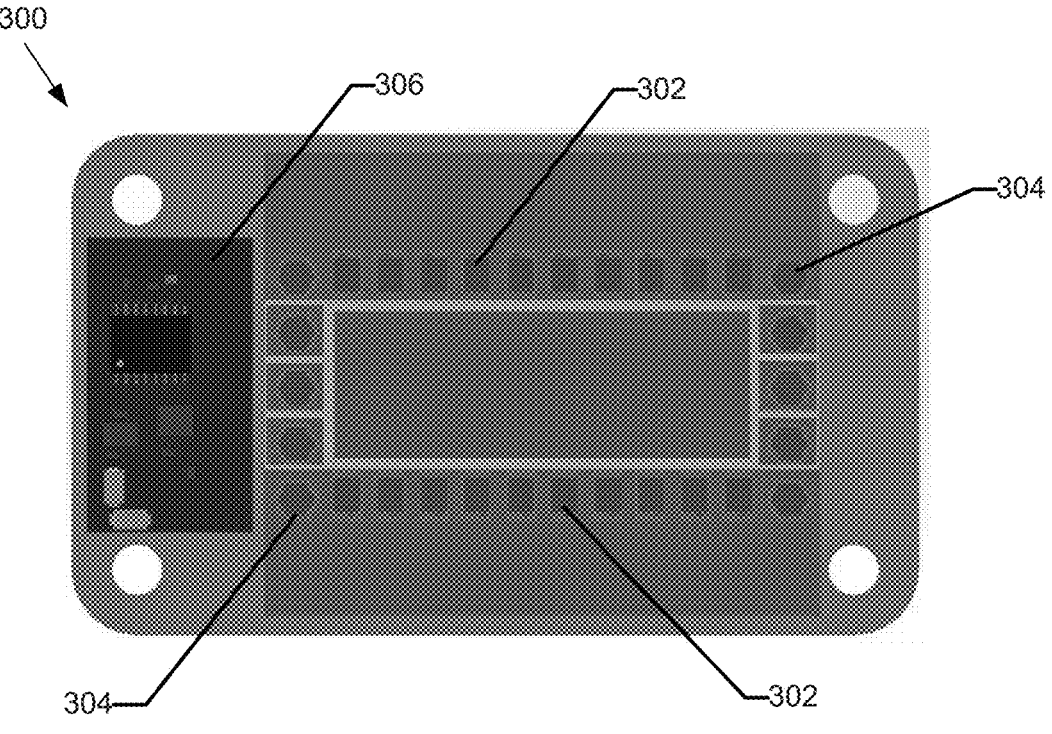
FIGS. 3A and 3B are plan views of an SSCB module in accordance with some embodiments of the inventive concept.
Figure 3B:
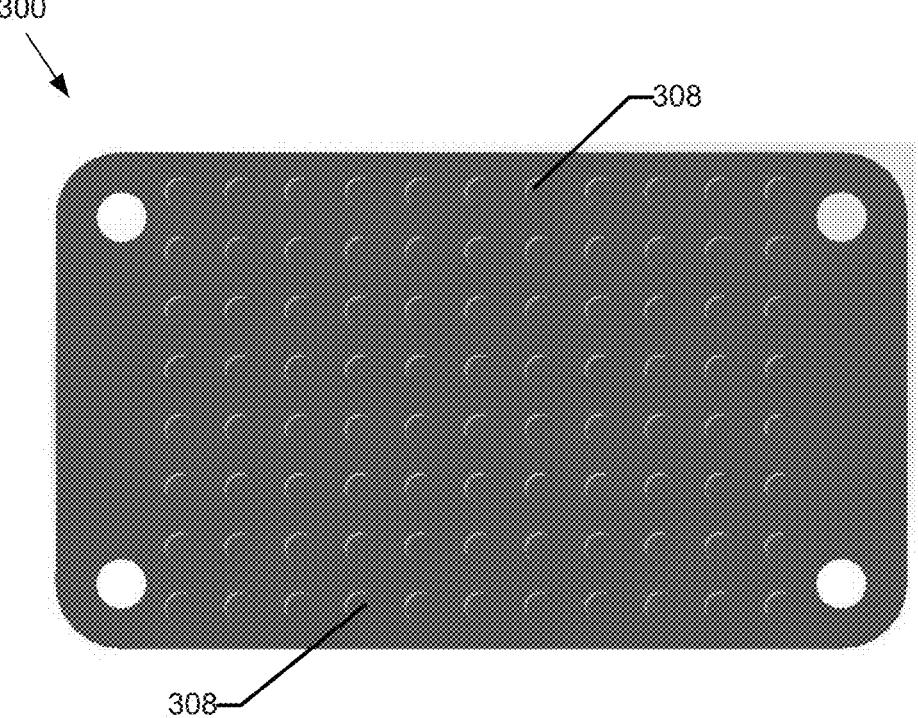

FIGS. 3A and 3B are plan views of an SSCB module 300 in accordance with some embodiments of the inventive concept. Referring to FIG. 3A, a top plan view of the plate of the SSCB module 300 housing is shown that contains integration of the switches 302 and the TVS diodes 304 or MOVs. As described above, with respect to FIG. 2, the switches 302 and TVS diodes 304 may be configured in a variety of different ways to form circuit breaker circuits. Moreover, the circuit breaker circuits described above with respect to FIG. 2 may be connected in a variety of different ways using the switches 302 and TVS diodes 304 or MOVs. For example, the circuit breaker circuits may be connected in parallel, in series, or in a circuit including one or more individual circuit breaker circuits, one or more parallel connected circuit breaker circuits and/or one or more series connected circuit breaker circuits. In accordance with some embodiments of the inventive concept the switches 302 may be embodied in a variety of different ways. In some embodiments, the switches may comprise MOSFET devices. The MOSFET devices may comprise SiC MOSFET devices and/or Si MOSFET devices. In some embodiments, the switches 302 may comprise high electron mobility transistor (HEMT) devices. The HEMT devices may be GaN HEMT devices in some embodiments. In other embodiments, the switches 302 may be thyristors and/or insulated gate bipolar transistor (IGBT) devices. The switches 302 may be unidirectional switches for DC power embodiments or bidirectional switches for AC power embodiments. The bidirectional switches may be embodied using anti-series semiconductor switches e.g., SI or SI MOSFETs, IGBTs, and/or GaN HEMTs, or anti-parallel semiconductor switches, e.g., reverse blocking thyristors. Gate driver circuitry for the MOSFET switches 302 and/or the snubber circuit 155 may be further integrated into the top plate of the module housing as circuitry 306 in accordance with some embodiments.

Referring now to FIG. 3B, a bottom plan view of the plate of the SSCB module 300 housing is shown that comprises a heatsink with a plurality of fins 308 extending therefrom for thermal management of the SSCB module 150. In the example shown, multiple fins are arranged in rows and columns that extend from the surface of the baseplate. It will be understood that the number and shape of the fins 308 may vary in accordance with different embodiments of the inventive concept based on the amount of heat dissipation required for a given application.

Figure 4A:
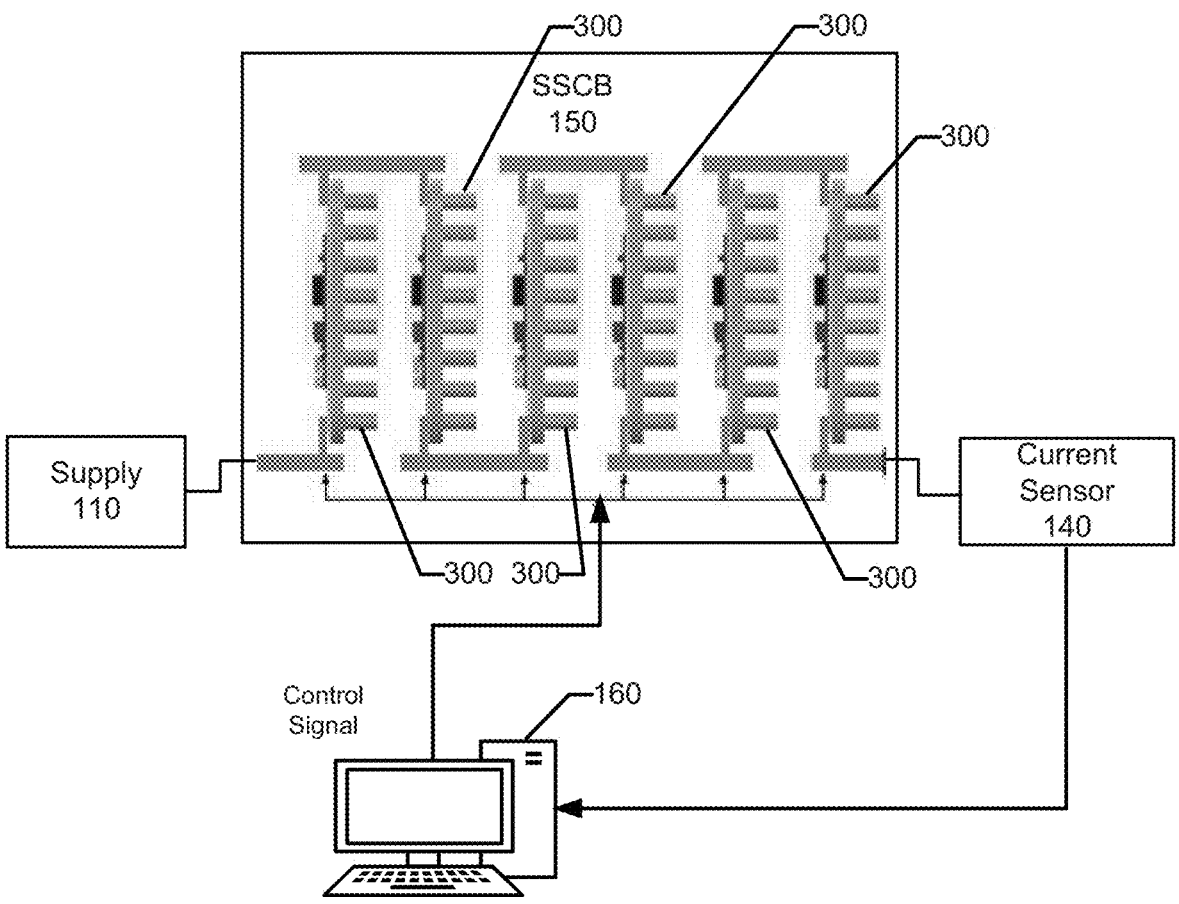
FIG. 4A is a block diagram that illustrates multiple SSCB modules connected in series in accordance with some embodiments of the inventive concept.

FIG. 4A is a block diagram that illustrates multiple SSCB modules 300 connected in series in accordance with some embodiments of the inventive concept. As shown in FIG. 4A, the SSCB system 150 may include multiple SSCB modules 300 connected in series, which may be used, for example, for applications involving higher voltages.

Figure 4B:
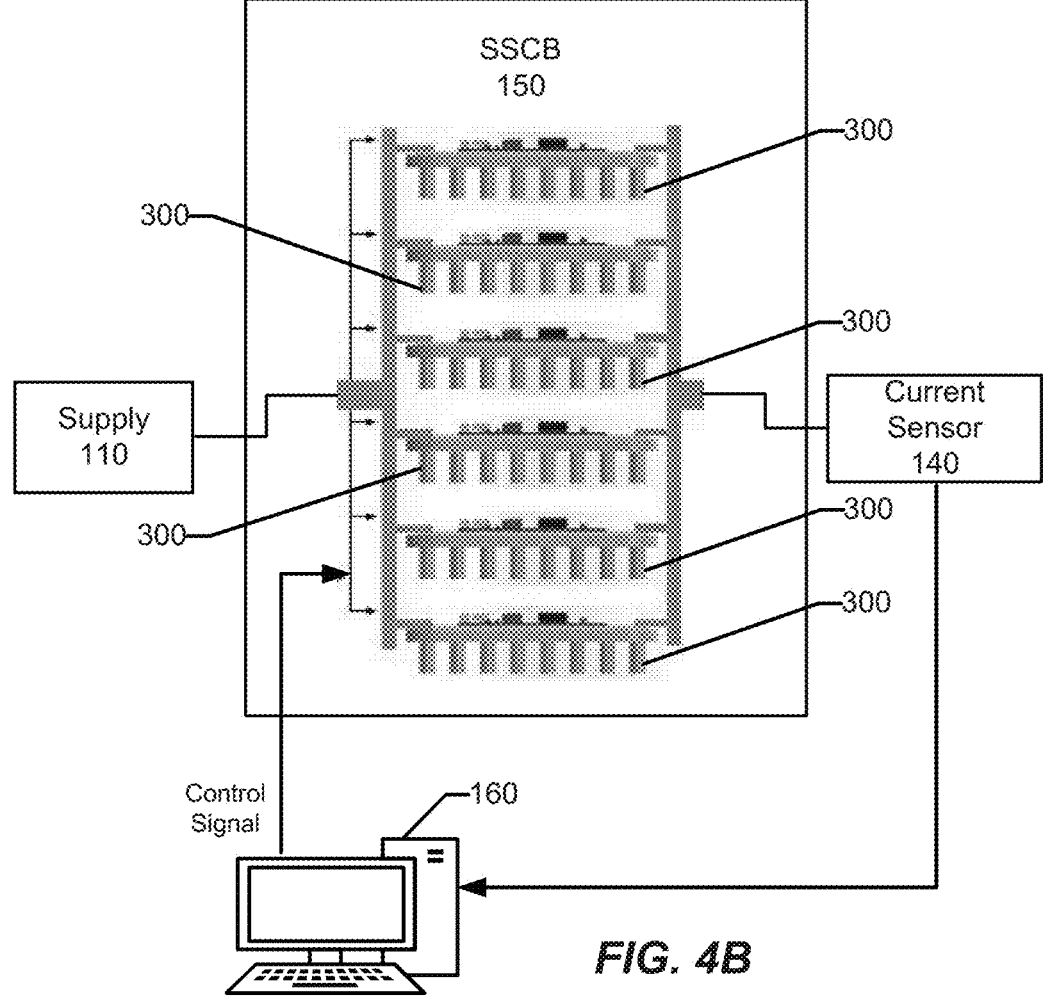
FIG. 4B is a block diagram that illustrates multiple SSCB modules connected in parallel in accordance with some embodiments of the inventive concept.

FIG. 4B is a block diagram that illustrates multiple SSCB modules 300 connected in parallel in accordance with some embodiments of the inventive concept. As shown in FIG. 4B, the SSCB system 150 may include multiple SSCB modules 300 connected in parallel, which may be used, for example, for applications involving higher currents.

While the SSCB modules 300 are shown connected in series in FIG. 4A and in parallel in FIG. 4B, it will be understood that the SSCB modules 300 may be connected in series, parallel, and/or in a circuit including one or more individual SSCB modules 300, one or more parallel connected SSCB modules 300, and/or one or more series connected SSCB modules 300.

Figure 5:
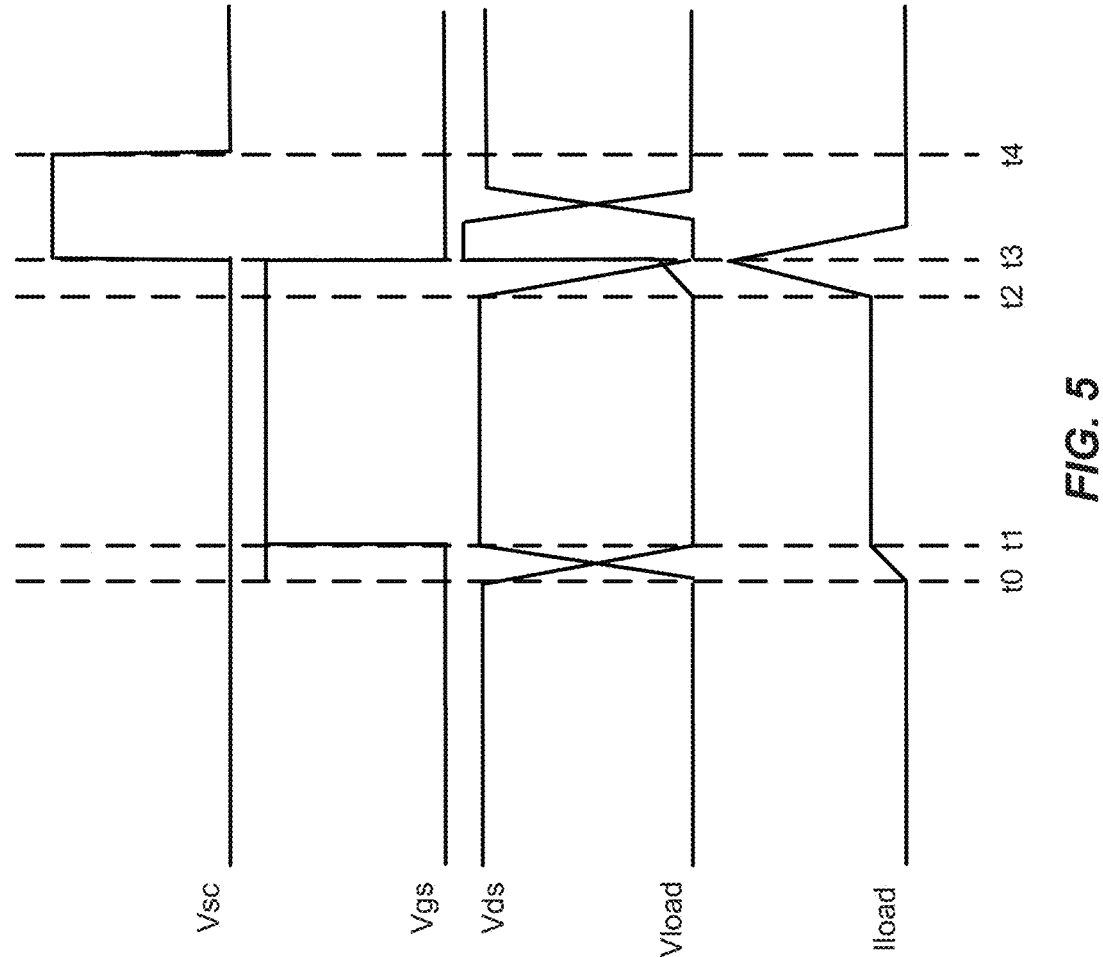
FIG. 5 is a waveform timing diagram that illustrates operations of an SSCB module in accordance with some embodiments of the inventive concept.

FIG. 5 is a waveform timing diagram that illustrates operations of an SSCB module 300 or an SSCB system 150 in accordance with some embodiments of the inventive concept. Referring to FIG. 5, FIG. 1, and FIG. 2, Vsc is the short circuit event notification signal output from the current sensor 140 upon detecting a short circuit, Vgs is the voltage developed across gate and source junction of the switch 204. Vds is the voltage developed across the drain and source terminals of the switch 204, Vload is the voltage developed across the load 130, and Iload is the current through the load 130 that is detected by the current sensor 140. At time to the poser system starts up and the controller 160 is configured to generate the control signal to close the switch 204 (turn on the MOSFET) allowing the supply 110 to supply power to the load 130. At time t1, the power system 100 operates under normal operating conditions with Vgs high based on the control signal output from the controller 160, Vds low, and the voltage across the load 130 and current through the load 130, Vload and Iload, assuming their steady state values. Compared with a Si MOSFET, a SiC MOSFET or a GaN HEMT can decrease on-state losses and reduce heat stress. At time t2 a short circuit fault event occurs causing the current Iload through the load 13 to increase dramatically and the voltage across the load 130 (Vload) to drop to around zero due to the low fault impedance. Then, the current sensor will drive the short circuit or overcurrent event notification signal Vsc high at time t3. The controller 160 generates the control signal to open the switch 204 by driving Vgs low to turn off the MOSFET switch, which causes the voltage across the SSCB 150 (Vds) to increase to the clamping voltage of the voltage clamping element, e.g., TVS diode and/or MOV. The high clamping voltage pushes the current Iload through the load 130 dropping to zero after briefly spiking due to the short circuit. The short circuit or overcurrent event notification signal Vsc transitions back to low at time t4 and the power system can start up again once the fault event has cleared responsive to the control signal output from the controller 160 driving Vgs high.

Figure 6:
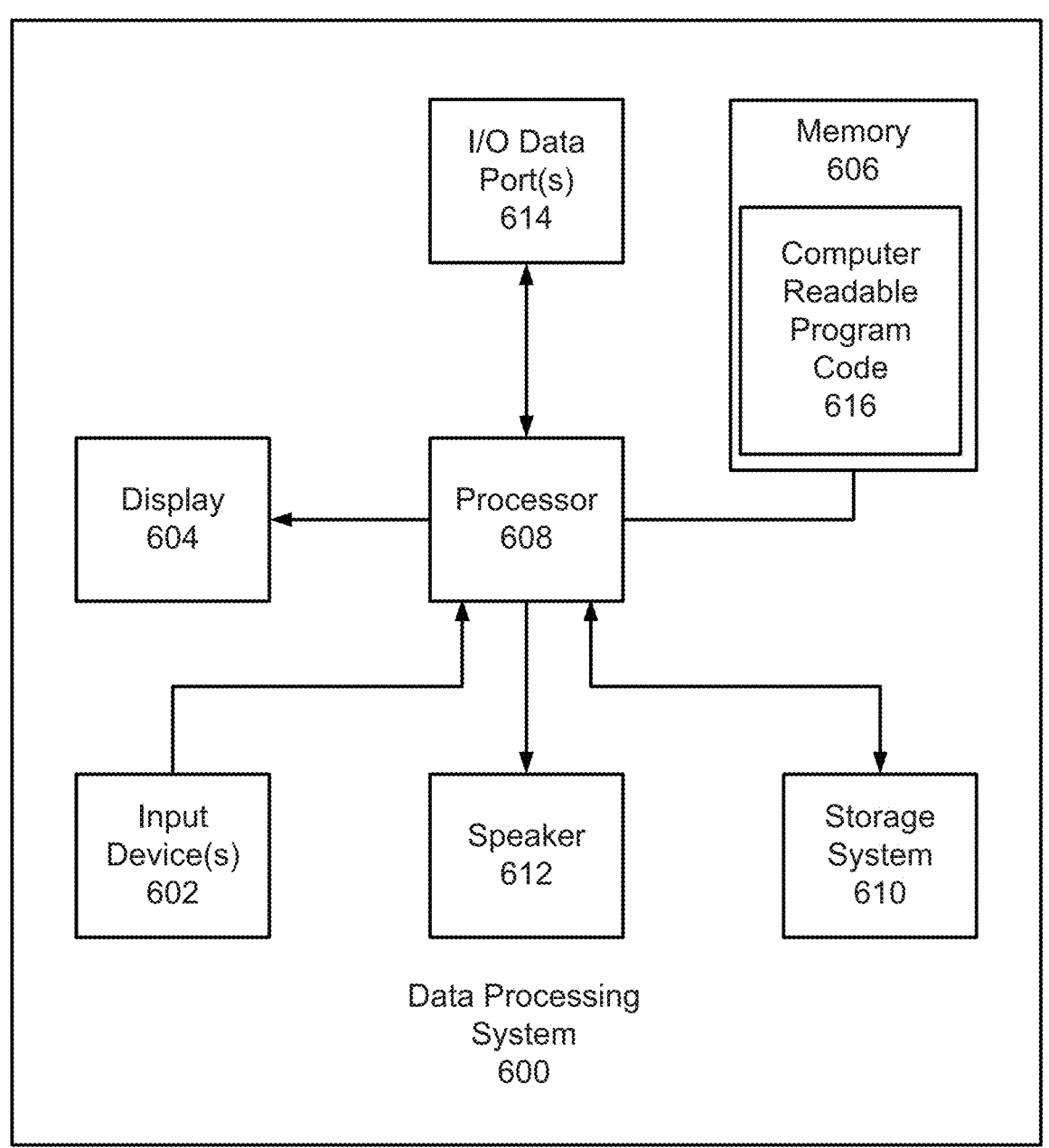
FIG. 6 is a data processing system that may be used to control a modular SSCB system in accordance with some embodiments of the inventive concept.

Referring now to FIG. 6, a data processing system 600 that may be used to implement the controller 160 of FIG. 1, in accordance with some embodiments of the inventive concept, comprises input device(s) 602, such as a keyboard or keypad, a display 604, and a memory 606 that communicate with a processor 608. The data processing system 500 may further include a storage system 610, a speaker 612, and an input/output (I/O) data port(s) 614 that also communicate with the processor 608. The processor 608 may be, for example, a commercially available or custom microprocessor. The storage system 610 may include removable and/or fixed media, such as floppy disks, ZIP drives, hard disks, or the like, as well as virtual storage, such as a RAMDISK. The I/O data port(s) 614 may be used to transfer information between the data processing system 600 and another computer system or a network (e.g., the Internet). These components may be conventional components, such as those used in many conventional computing devices, and their functionality, with respect to conventional operations, is generally known to those skilled in the art. The memory 606 may be configured with computer readable program code 606 to facilitate management of a modular solid-state circuit breaker system according to some embodiments of the inventive concept.

Figure 7:
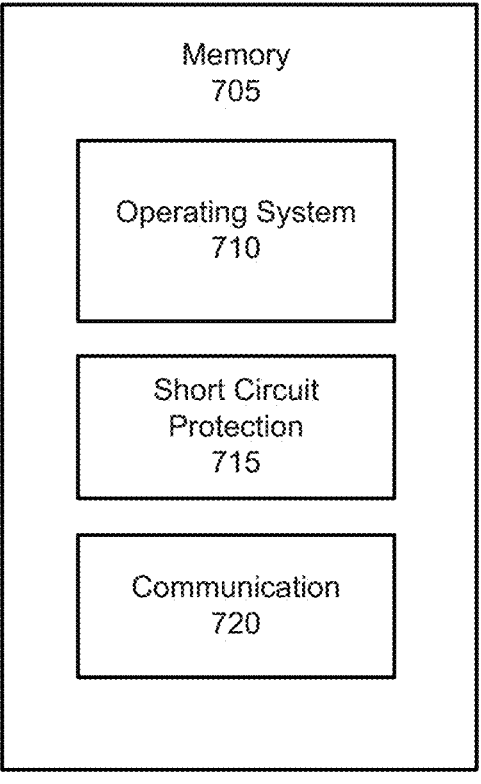
FIG. 7 is a block diagram that illustrates a software/hardware architecture for use in in a modular SSCB system in accordance with some embodiments of the inventive concept.

FIG. 7 illustrates a memory 705 that may be used in embodiments of data processing systems, such as the controller 160 of FIG. 1 and the data processing system of FIG. 6, respectively, to facilitate management of a modular solid-state circuit breaker system. The memory 705 is representative of the one or more memory devices containing the software and data used for facilitating operations of the controller 160 as described herein. The memory 705 may include, but is not limited to, the following types of devices: cache, ROM, PROM, EPROM, EEPROM, flash, SRAM, and DRAM. As shown in FIG. 7, the memory 705 may contain three or more categories of software and/or data: an operating system 710, a short circuit protection module 715, and a communication module 720. In particular, the operating system 710 may manage the data processing system's software and/or hardware resources and may coordinate execution of programs by the processor. The short circuit protection module 715 may be configured to perform one or more of the operations described above with respect to the controller 160 and FIGS. 2, 3A, 3B, 4A, 4B, and 5. The communication module 720 may be configured to facilitate communication between the controller 160 and one or more SSCB systems 150.

Although FIG. 7 illustrates hardware/software architectures that may be used in data processing systems, such as the controller 160 of FIG. 1 in accordance with some embodiments of the inventive concept, it will be understood that embodiments of the present invention are not limited to such a configuration but is intended to encompass any configuration capable of carrying out operations described herein.

Computer program code for carrying out operations of data processing systems discussed above with respect to FIGS. 1-7 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the controller 160 and the data processing system 600 of FIG. 6 may each be implemented as a single processor system, a multi-processor system, a multi-core processor system, or even a network of stand-alone computer systems, in accordance with various embodiments of the inventive concept. Each of these processor/computer systems may be referred to as a "processor"

or "data processing system." The functionality provided by the controller 160 may be embodied as a single server or embodied as separate servers in accordance with different embodiments of the inventive concept.

The data processing apparatus described herein with respect to FIGS. 1-6 may be used to facilitate management of a modular solid-state circuit breaker system according to some embodiments of the inventive concept described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 705 when coupled to a processor includes computer readable program code that, when executed by the processor, causes the processor to perform operations including one or more of the operations described herein with respect to FIGS. 1-5

Some embodiments of the inventive concept described herein may provide a SSCB module that provides both improved electrical and thermal management performance. By integrating sub-components, such as the switches, one or more voltage clamping elements, such as TVS diodes and/or MOVs, and/or gate drivers, loop inductance induced overvoltage can be reduced. The reduced overvoltage may allow the switches to be implemented using lower voltage semiconductor devices with lower on-resistance for both the switches and TVS diodes and/or MOVs compared to using discrete implementations of these components. Integration of gate driver circuitry for the semiconductor switches may provide further improvements to the electrical performance of the SSCB module by reducing the parasitic gate inductance while also reducing volume and weight. Moreover, the simplified thermal management system of using a heatsink with one or more fins extending therefrom as baseplate of the SSCB module housing reduces the mechanical support and weight required to support alternative thermal management systems based on liquid or forced air cooling. The SSCB module may also be further customized in a variety of ways including configuring the arrangement of the individual circuit breaker circuits therein, which may include one or more switches coupled in parallel to one or more TVS diodes and/or MOVs. These circuit breaker circuits may then be configured in a variety of different serial and parallel arrangements based on application. The SSCB modules provide a reconfiguration capability that may be particularly useful in adapting their use to the different voltage and current requirements of a variety of different power systems. Likewise, the SSCB modules may also be arranged in a variety of different serial and parallel arrangements based on application. Serial configurations may be used for higher voltage applications while parallel configurations may be used for higher current applications. The SSCB module enclosure may be further customized with insulation as desired.

Further Definitions and Embodiments

In the above-description of various embodiments of the present inventive concept, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component." or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the inventive concept. The aspects of the inventive concept herein were chosen and described to best explain the principles of the inventive concept and the practical application, and to enable others of ordinary skill in the art to understand the inventive concept with various modifications as are suited to the particular use contemplated.

What is claimed is:

1. A system, comprising:
a first module housing comprising a first heatsink and having a first plurality of fins extending therefrom configured to dissipate heat; and
a first circuit breaker circuit comprising at least one first semiconductor switch connected in parallel to a first at least one voltage clamping element, the first at least one semiconductor switch and the first at least one voltage clamping element of the first circuit breaker circuit being integrated with one another inside the first module housing;
wherein the first at least one voltage clamping element comprises a first at least one transient voltage suppression (TVS) diode;
a second module housing comprising a second heatsink and having a second plurality of fins extending therefrom configured to dissipate heat; and
a second circuit breaker circuit comprising a second at least one semiconductor switch connected in parallel to a second at least one voltage clamping element, the second at least one semiconductor switch and the second at least one voltage clamping element of the second circuit breaker circuit being integrated with one another inside the second module housing;
wherein the second at least one voltage clamping element comprises a second at least one TVS diode.

2. The system of claim 1, wherein the first circuit breaker circuit comprises a plurality of semiconductor switches connected in parallel to the at least one voltage clamping element.

3. The system of claim 2, wherein the first circuit breaker circuit comprises the plurality of semiconductor switches connected in parallel to a plurality of voltage clamping elements, respectively.

4. The system of claim 1, wherein the first at least one voltage clamping element further comprises at least one metal oxide varistor (MOV);
wherein the first semiconductor switch is a metal oxide semiconductor field effect transistor (MOSFET); and wherein the first at least one voltage clamping element is configured to clamp a voltage across the voltage clamping element and to absorb energy from system inductance responsive to cutting off a fault current.

5. The system of claim 4, wherein the MOSFET is a SiC MOSFET or an Si MOSFET.

6. The system of claim 1, wherein the first semiconductor switch is a high electron mobility transistor (HEMT), a thyristor, or an insulated gate bipolar transistor (IGBT).

7. The system of claim 6, wherein the HEMT is a GaN HEMT.

8. The system of claim 1, wherein the first semiconductor switch is a unidirectional switch.

9. The system of claim 1, wherein the first semiconductor switch is a bidirectional switch;

wherein the first semiconductor switch comprises one or more anti-series semiconductor switches or one or more anti-parallel semiconductor switches.

10. The system of claim 1, further comprising:

a snubber circuit connected in parallel to the first circuit breaker circuit, the snubber circuit being integrated inside the first module housing.

11. The system of claim 1, further comprising a driver circuit integrated inside the first module housing and connected to the first at least one semiconductor switch.

12. The system of claim 1, wherein the first circuit breaker circuit is a first circuit breaker circuit of one of a plurality of first circuit breaker circuits.

13. The system of claim 12, wherein the first circuit breaker circuits are connected in series.

14. The system of claim 12, wherein the first circuit breaker circuits are connected in parallel.

15. The system of claim 12, wherein a first subset of the plurality of first circuit breaker circuits are connected in series and a second subset of the plurality of circuit breaker circuits are connected in parallel.

16. A system, comprising:

at least one solid-state circuit breaker (SSCB) module, the SSCB module comprising:

a module housing comprising a heatsink and having a plurality of fins extending therefrom configured to dissipate heat; and a circuit breaker circuit comprising at least one semiconductor switch connected in parallel to at least one voltage clamping element, the at least one semiconductor switch and the at least one voltage clamping element of the circuit breaker circuit being integrated with one another inside the module housing; and a controller coupled to the SSCB module and configured to generate a control signal responsive to a short circuit event in an electrical load;

wherein the at least one semiconductor switch is responsive to the control signal; and wherein the at least one voltage clamping element comprises at least one transient voltage suppression (TVS) diode;

wherein the at least one SSCB module is a first SSCB module, the module housing is a first module housing, the heatsink is a first heatsink, the plurality of fins is a first plurality of fins, the circuit breaker circuit is a first circuit breaker circuit, the at least one semiconductor switch is a first semiconductor switch, the at least one voltage clamping element is a first at least one voltage clamping element, and the at least one TVS diode is a first one TVS diode, the system further comprising:

a second SSCB module, comprising:

a second module housing comprising a second heatsink and having a second plurality of fins extending therefrom configured to dissipate heat; and a second circuit breaker circuit comprising a second at least one semiconductor switch connected in parallel to a second at least one voltage clamping element, the second at least one semiconductor switch and the second at least one voltage clamping element of the second circuit breaker circuit being integrated with one another inside the second module housing; and wherein the controller is coupled to the first and second SSCB modules;

wherein the second at least one semiconductor switch is responsive to the control signal; and wherein the second at least one voltage clamping element comprises a second at least one TVS diode.

17. The system of claim 16, wherein the first and second SSCB modules are connected in series.

18. The system of claim 16, wherein the first and second SSCB modules are connected in parallel.

19. The system of claim 16, further comprising a third SSCB module, and a fourth SSCB module that are electrically connected to the first SSCB module and the second SSCB module;

wherein first and third SSCB modules are connected in series and the second and fourth SSCB modules are connected in parallel.

* * * * *